(12) United States Patent
Shipp

(10) Patent No.: US 11,015,519 B2
(45) Date of Patent: May 25, 2021

(54) EARLY INTAKE VALVE CLOSING AND VARIABLE GEOMETRY TURBOCHARGER CONTROL

(71) Applicant: Cummins Inc., Columbus, IN (US)

(72) Inventor: Timothy Shipp, Seymour, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/657,068

(22) Filed: Oct. 18, 2019

(65) Prior Publication Data

US 2021/0115843 A1    Apr. 22, 2021

(51) Int. Cl.
| | | |
|---|---|---|
| *F02B 37/24* | (2006.01) | |
| *F02D 41/00* | (2006.01) | |
| *F02D 13/02* | (2006.01) | |

(52) U.S. Cl.
CPC .......... *F02B 37/24* (2013.01); *F02D 13/0223* (2013.01); *F02D 41/0007* (2013.01); *F02D 2200/024* (2013.01); *F02D 2200/0408* (2013.01)

(58) Field of Classification Search
CPC ................. F02B 37/24; F02D 13/0223; F02D 41/0007; F02D 2200/0408; F02D 2200/024
USPC ......................................... 60/600, 605.1, 611
See application file for complete search history.

(56) References Cited

U.S. PATENT DOCUMENTS

| | | |
|---|---|---|
| 7,380,447 B2 | 6/2008 | Rollinger et al. |
| 8,141,358 B2* | 3/2012 | Kolmanovsky ....... F02D 41/065 60/605.1 |
| 9,051,871 B1 | 6/2015 | Wu et al. |
| 9,228,536 B2 | 1/2016 | zur Loye et al. |
| 9,399,969 B2 | 7/2016 | Boyer et al. |
| 9,587,589 B2 | 3/2017 | Kemmerling et al. |
| 9,915,194 B2 | 3/2018 | Boyer et al. |
| 10,125,700 B2 | 11/2018 | Antcliff et al. |
| 2007/0074513 A1 | 4/2007 | Lamb et al. |
| 2007/0234985 A1* | 10/2007 | Kolmanovsky ..... F02D 13/0253 123/90.15 |
| 2007/0235005 A1* | 10/2007 | Lewis ....................... F01L 9/04 123/322 |
| 2016/0102636 A1* | 4/2016 | Styles ................... F02D 41/006 123/568.21 |
| 2017/0159581 A1 | 6/2017 | McCarthy, Jr. et al. |
| 2018/0100459 A1 | 4/2018 | Dickson et al. |

* cited by examiner

*Primary Examiner* — Hoang M Nguyen
(74) *Attorney, Agent, or Firm* — Taft Stettinius & Hollister LLP

(57) ABSTRACT

Systems, apparatus, and methods are disclosed that include an internal combustion engine having a plurality of cylinders and controlling a variable geometry turbocharger during early intake valve opening to reduce or prevent oil consumption.

20 Claims, 3 Drawing Sheets

EARLY INTAKE VALVE CLOSING AND VARIABLE GEOMETRY TURBOCHARGER CONTROL

FIELD OF THE INVENTION

This invention relates to an internal combustion engine including multiple cylinders, and more particularly to controlling variable geometry turbocharger (VGT) operation in conjunction with early intake valve closing of one or more cylinders.

BACKGROUND

The cylinders in an internal combustion engine can be operated with Miller cycling for efficiency improvements and NOx reduction. This may be accomplished by late intake valve closing or early intake valve closing. Late intake valve closing is typically employed due to operational challenges with early intake valve closing.

For example, early intake valve closing significantly before bottom dead center of the piston causes the pressure in the cylinder to reduce as the volume is increased. Depending on the intake manifold pressure, the in-cylinder pressure at bottom dead center can drop below crankcase pressure, which could allow oil to be pulled past the piston rings and into the combustion chamber. The earlier the intake valve closing before bottom dead center, the greater the concern. Therefore, further improvements are needed if early intake valve closing is to be employed for Miller cycle operation of an internal combustion engine.

SUMMARY

Embodiments include unique systems, apparatus, and methods that include a multi-cylinder internal combustion engine configured to operate with early intake valve closing. In one embodiment, the engine includes a VGT that is used to increase intake manifold pressure during conditions in which the in-cylinder pressure can drop below a crankcase pressure, thus reducing or preventing oil consumption during Miller cycling using early intake valve closing. A controller may be configured to receive one or more inputs associated with an in-cylinder pressure and to control operation of the VGT to increase intake manifold pressure when the in-cylinder pressure is determined and/or predicted to drop below crankcase pressure.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
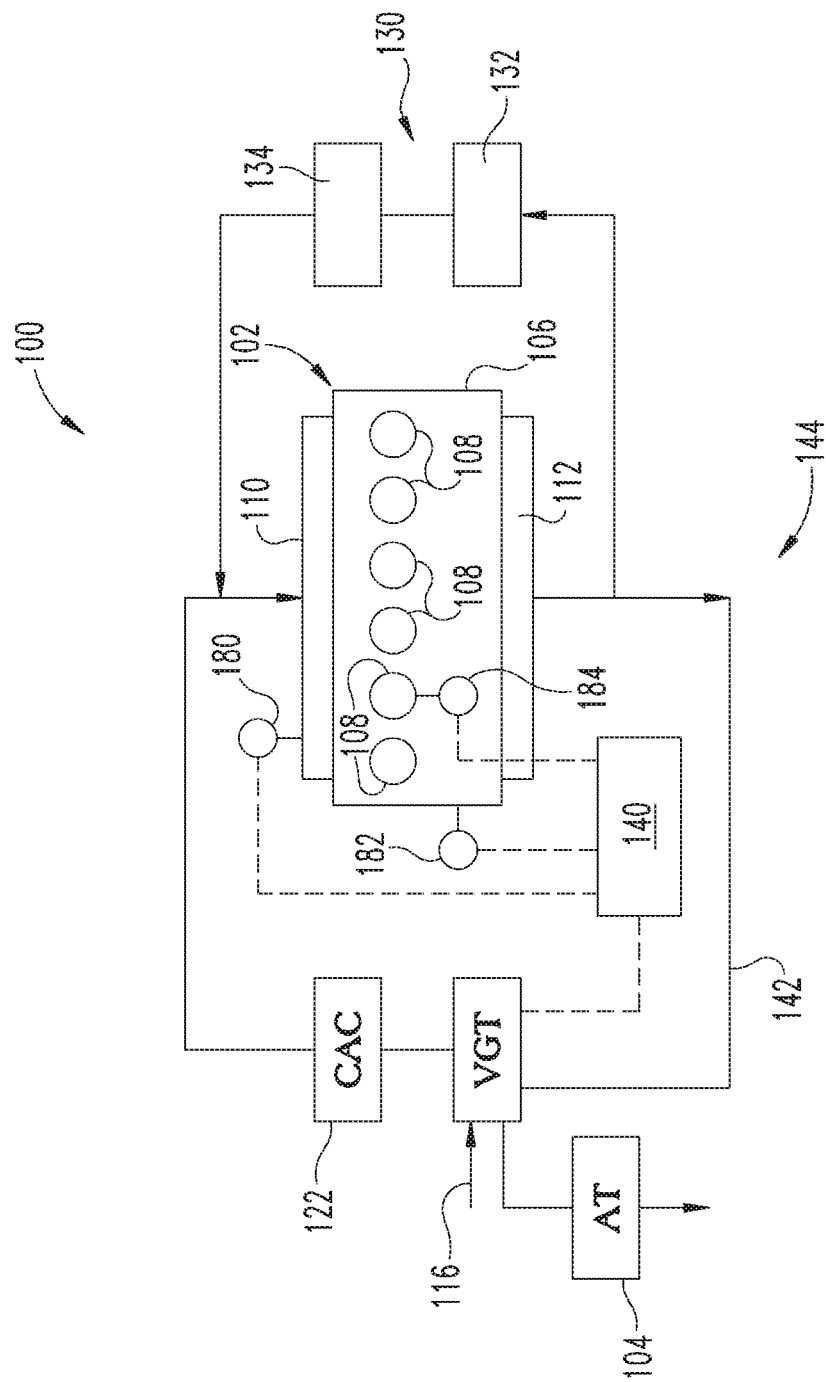
FIG. 1 is a schematic depiction of one embodiment of an internal combustion engine system including a VGT.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1, a system 100 includes an engine 102 fluidly coupled to an aftertreatment system 104. The system 100 may further includes a transmission (not shown) coupled to the engine 102, which may be a part of a powertrain for propelling a vehicle driven by engine 102 via wheels. Other embodiments contemplate that system 100 is a marine application, locomotive application, part of a genset for powering a generator, or other motive or non-motive application. The engine 102 may be any type of internal combustion engine capable of operating with a Miller cycle, including at least a diesel, gasoline, natural gas engine, and/or combinations thereof.

In certain embodiments, the engine 102 includes a lean combustion engine such as a lean burn gasoline engine or a diesel cycle engine. In certain embodiments, the engine 102 may be any engine type producing emissions that may include an exhaust gas recirculation (EGR) system, for example to reduce $NO_x$ emissions from the engine 102. In the illustrated embodiment of FIG. 1, the system 100 includes an engine 102 having an in-line 6-cylinder arrangement for illustration purposes. However, V-shaped arrangements and other any number of cylinders with V-shaped arrangements, multiple cylinder bank arrangements, and other in-line arrangements are also contemplated.

Figure 2:
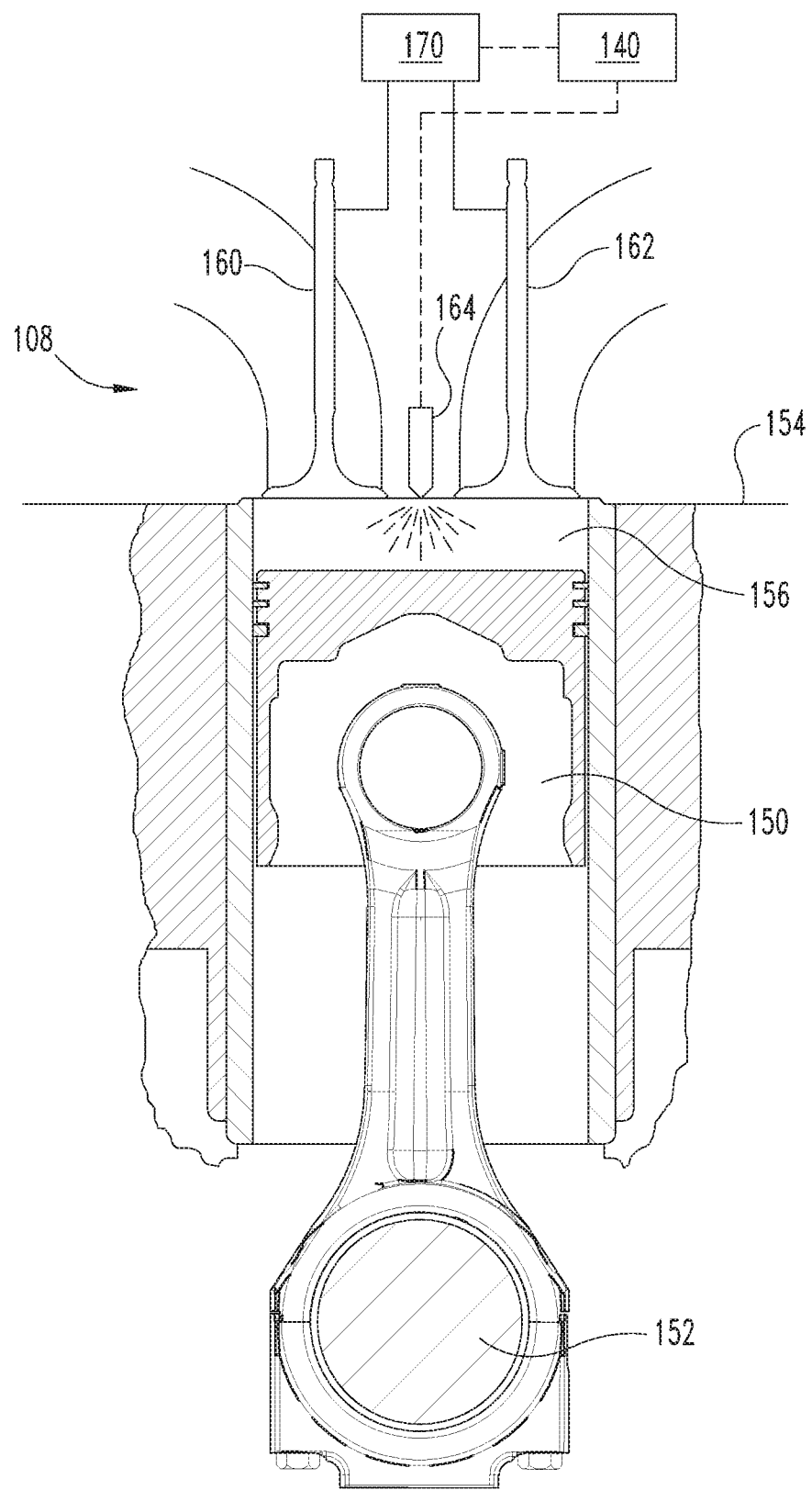
FIG. 2 is a schematic depiction of an example of a cylinder of the internal combustion engine of FIG. 1.

Referring further to FIG. 2, a typical multi-cylinder engine 102 has an engine block 106 with multiple cylinders 108 each with a combustion chamber 156 housing a piston 150 that is operably attached to a crankshaft 152. There is also at least one intake valve 160 and at least one exhaust valve 162 that allow passage of air into and out of each cylinder 108 from an intake manifold 110 to an exhaust manifold 112. The typical engine 102 operates on a four-stroke cycle that sequentially includes an air intake stroke, a compression stroke, a power stroke, and an exhaust stroke for the piston of each cylinder. As used herein, one cycle of the cylinder 108 or engine 102 occurs at the completion of these four strokes.

One embodiment of the cylinder 108 includes piston 150 housed in combustion chamber 156 and operably attached to crankshaft 152, which is rotated by reciprocal movement of piston 150 in combustion chamber 156. Within a cylinder head 154 associated with the cylinder 108, there is at least one intake valve 160, at least one exhaust valve 162 and a fuel injector 164 that provides fuel to combustion chamber 156 between the piston 150 and the cylinder head 154. In other embodiments, fuel can be provided to combustion chamber 156 by port injection, or by injection in the intake system, upstream of combustion chamber 156.

The term "four-stroke" herein means the following four strokes—intake, compression, power, and exhaust—that the piston 150 completes during two separate revolutions of the engine's crankshaft 152. A stroke begins either at top dead center (TDC), when the piston 150 is at the top of cylinder head 154 of the cylinder 108, or at bottom dead center (BDC), when the piston 150 has reached its lowest point in the cylinder 108.

During the intake stroke, the piston 150 descends away from cylinder head 154 of the cylinder 108 to a bottom (not shown) of the cylinder 108, thereby reducing the pressure in the combustion chamber 156 of the cylinder 108. In the instance where the engine 102 is a diesel engine, a combustion charge is created in the combustion chamber 156 by an intake of air through the intake valve 160 when the intake valve 160 is opened.

During the compression stroke, both the intake valve 160 and the exhaust valve 162 are closed, the piston 150 returns toward TDC and fuel is injected near TDC in the compressed air in a main injection event, and the compressed fuel-air mixture ignites in the combustion chamber 156 after a short delay. In the instance where the engine 102 is a diesel engine, this compression results in the combustion charge being ignited. The ignition of the air and fuel causes a rapid increase in pressure in the combustion chamber 156, which is applied to the piston 150 during its power stroke toward BDC. Combustion phasing in combustion chamber 156 is calibrated so that the increase in pressure in combustion chamber 156 pushes piston 150, providing a net positive in the force/work/power of piston 150.

During the exhaust stroke, the piston 150 is returned toward TDC while the exhaust valve 162 is open. This action discharges the burnt products of the combustion of the fuel in the combustion chamber 156 and expels the spent fuel-air mixture (exhaust gas) out through the exhaust valve 162.

The ambient air flow 116 provides intake air that flows through intake manifold 110 before reaching the intake valve 160. The intake passage may be connected to a compressor of a VGT 120, a charge air cooler (CAC) 122, and an optional intake air throttle (not shown). The intake air can be purified by an air cleaner (not shown), compressed by the compressor, and then aspirated into the combustion chamber 156.

The exhaust gas flows out from the combustion chamber 156 into an exhaust system 144 that includes an exhaust passage 142 extending from exhaust manifold 112. The exhaust passage 142 is connected to a turbine of VGT 120 and to an exhaust gas recirculation (EGR) system 130. Exhaust gas from the turbine of VGT 120 then flows into aftertreatment system 104 that includes one or more aftertreatment devices. The aftertreatment system 104 may include any type of aftertreatment components known in the art, including catalytic and/or filtration components. Example aftertreatment components may include, without limitation, oxidation catalysts (e.g., a diesel oxidation catalyst ("DOC"), $NO_x$ treatment components (e.g., three-way catalyst, lean NOx catalyst, SCR catalyst, etc.), a filtration component (either catalyzed or uncatalyzed, e.g., a diesel particulate filter ("DPF"), and a cleanup catalyst (e.g., an ammonia oxidation catalyst).

The present system 100 includes VGT 120 connected to exhaust manifold 112. A VGT 120 may include movable vanes, but the VGT 120 can also be a variable nozzle turbine having a movable wall instead of movable vanes. VGT 120 includes a turbine that receives exhaust flow and a compressor that receives ambient air flow 116. The compressor compresses the ambient air and provides it to CAC 122 which is connected to intake manifold 110. The exhaust manifold 112 is also connected to EGR system 130 that includes an EGR valve 132 and an EGR cooler 134. EGR system 130 is operable to provide an EGR flow that combines with an intake flow at a position upstream of intake manifold 110. Intake manifold 110 provides a charge flow including the intake flow and, if provided, the EGR flow to cylinders 108.

System 100 further includes a fuel system (not shown) that is operable to provide fuel from a fuel storage source, such as a fuel tank, to cylinders 108. A plurality of fuel injectors can be provided, at least one per cylinder such as shown with injector 164, to inject fuel into each cylinder 108 in response to a fueling command from a controller 140. In one embodiment, the fuel injectors are direct injectors. It should be understood that any suitable fuel system is contemplated.

In operation, the intake valve 160 and/or exhaust valve 162 may be open and/or closed by a valve operating mechanism 170, such as a cam shaft having cam lobes that are connected to the intake valve 160 and/or exhaust valve 162 with any suitable valve operating mechanism 170 known in the art. In one embodiment, the valve opening mechanism 170 is operated to so that intake valve 160 is closed early during the intake stroke, such as before bottom dead center of piston 150 during the intake stroke, to provide Miller cycling benefits.

The controller 140 is connected to a plurality of sensors shown schematically as sensors 180, 182, 184. The sensors may be physical or virtual sensors and include, but are not limited to, an intake manifold pressure sensor 182 to detect, estimate, or sense intake manifold pressure; engine sensor or sensors 182 to detect, estimate or sense engine conditions such as crankcase pressure; and cylinder sensor or sensors 184 which detect, sense, or estimate in-cylinder pressure in one or more cylinder 108, cam shaft position (intake and/or exhaust), intake valve closing angle, and/or volume changes in the cylinder between intake valve closing and bottom dead center. Sensors may also be provided for vehicle speed, vehicle acceleration, engine position, engine speed, mass air flow into the manifold, engine temperature, air temperature barometric pressure, EGR amount, VGT position, torque demand, gear position, etc.

In certain embodiments, the controller 140 is structured or configured to perform certain operations to control operations of engine 102. In certain embodiments, the controller 140 forms a portion of a processing subsystem including one or more computing devices having memory, processing, and communication hardware. The controller 140 may be a single device or a distributed device, and the functions of the controller 140 may be performed by hardware or software. The controller 140 may be included within, partially included within, or completely separated from an engine controller (not shown). The controller 140 is in communication with any sensor or actuator throughout the system 100, including through direct communication, communication over a datalink, and/or through communication with other controllers or portions of the processing subsystem that provide sensor and/or actuator information to the controller 140.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controller or controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Certain systems are described following, and include examples of controller operations in various contexts of the present disclosure. The operation of the engine 102, valve operating mechanism 170, and VGT 120 is controlled by the controller 140 in response to engine operating conditions sensed by the sensors represented by sensor(s) 180, 182, 184. In certain embodiments, the controller 140 interprets or determines a cylinder pressure of one or more cylinders 108 is less than a crankcase pressure of engine 102, and in response thereto commands the VGT 120 to increase the intake manifold pressure. The command to increase the intake manifold pressure can include closing the VGT 120 or opening the VGT 120, depending on the current position of the VGT 120. It is also contemplated the command to increase intake manifold pressure includes commands to increase energy to the turbine, such as by delayed injection timing or lowering fuel rail pressure.

Figure 3:
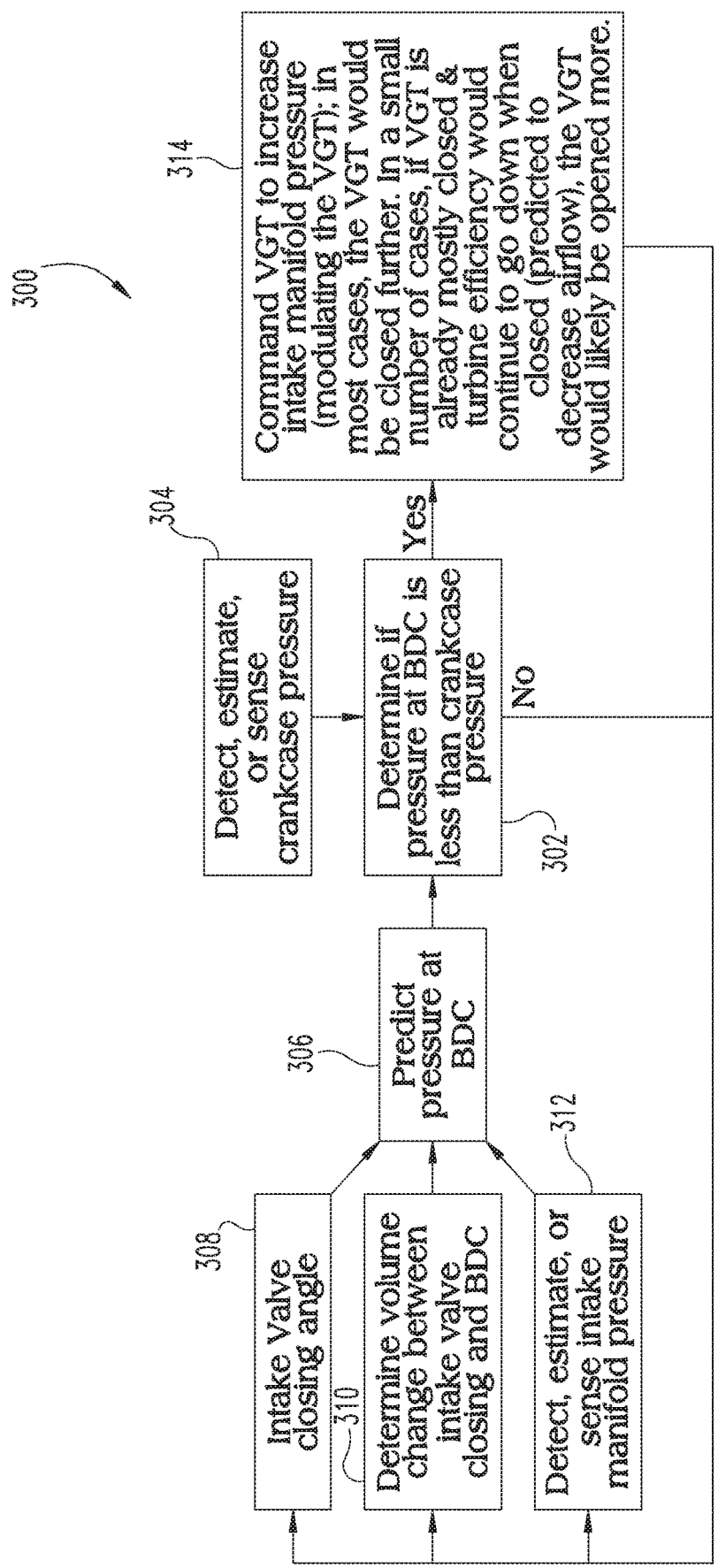
FIG. 3 is a flow diagram of a procedure for VGT operation of the system of FIG. 1 in response to in-cylinder pressure and crankcase pressure.

Referring now to FIG. 3, there is shown a procedure 300 for operating system 100. Procedure 300 includes a conditional 302 to determine if the pressure in one or more cylinders 108 at bottom dead center of piston 150 is less than a crankcase pressure of engine 102. In order to make this determination, procedure 300 includes an operation 304 to detect, estimate, or sense the crankcase pressure, such as with sensor 182. Procedure 300 also includes an operation 306 to make a prediction of the pressure in cylinder 108 at bottom dead center of the piston 150. The determinations from operations 304 and 306 are input to conditional 302 to make the determination of conditional 302.

In one embodiment, operation 306 includes three different inputs to determine the prediction or estimate of cylinder pressure at bottom dead center of piston 150 during the intake stoke of piston 150. One input 308 includes the intake valve 160 closing angle, such as the crank angle of the crankshaft 152 when the intake valve 160 is closed. Procedure 300 includes a second input 310 that includes a determination of a volume change in the cylinder 108 between the intake valve 160 closing and bottom dead center of the piston 150. Procedure 300 includes a third input 312 of the intake manifold pressure of intake manifold 110, such as from sensor 180. Inputs 308, 310, 312 are used to make an estimate of the in-cylinder pressure at bottom dead center of piston 150 during the intake stroke at operation 306.

Returning to conditional 302, if the cylinder pressure at bottom dead center of piston 150 is not less than the crankcase pressure of engine 102, then conditional 302 is NO and an oil consumption issue is not present. Procedure 300 continues to monitor crankcase pressure and in-cylinder pressure at bottom dead center. If conditional 302 is YES, then procedure 300 continues at operation 314 to command the VGT 120 to increase the pressure at intake manifold 110, which will prevent or reduce oil blow by from the crankcase into the combustion chambers of cylinders 108. Typically, the command includes causing the VGT inlet of VGT 120 to modulate by closing or reducing the inlet size to increase intake manifold pressure. However, if the inlet is already mostly closed, and turbine efficiency would decrease when the inlet is closed further such as by reducing airflow, then the VGT 120 may be opened at operation 314. It is also contemplated the command to increase intake manifold pressure can increase energy to the turbine by other means, such as by delayed injection timing or lowering fuel rail pressure.

Various aspects of the present disclosure are contemplated as indicated in the present disclosure. According to one aspect, a system includes an internal combustion including an intake manifold and a plurality of cylinders. Each of the cylinders includes at least one intake valve and at least one exhaust valve. The system includes a VGT for receiving an exhaust flow from the plurality of cylinders and a controller operably connected with the VGT. The controller is configured to determine a crankcase pressure, determine a cylinder pressure of at least one cylinder associated with an early intake valve closing event, and, in response to the cylinder pressure being less than the crankcase pressure, the VGT is used to increase intake manifold pressure.

In one embodiment, the crankcase pressure is determined by one of detecting, sensing, or estimating the crankcase pressure. In one embodiment, the cylinder pressure is determined at bottom dead center of a piston of the at least one cylinder.

In one embodiment, the cylinder pressure is determined by predicting the cylinder pressure at bottom dead center of a piston of the at least one cylinder. In one embodiment, the prediction is based on an intake valve closing angle, a volume change in the cylinder between the early intake valve closing and bottom dead center of a piston of the at least one cylinder, and the intake manifold pressure. In one embodiment, the intake manifold pressure is determined by one of sensing, detecting, or estimating the intake manifold pressure.

In one embodiment, the intake manifold pressure is increased by closing the VGT. In one embodiment, the intake manifold pressure is increased by opening the VGT.

In another aspect, a method for operating an internal combustion engine includes determining a crankcase pressure associated with operation of an internal combustion engine including a plurality of cylinders each including at least one intake valve and at least one exhaust valve; determining a pressure in at least one cylinder at bottom dead center of a piston in the at least one cylinder; and, in response to the pressure in the at least one cylinder being less than the crankcase pressure, controlling a VGT to increase an intake manifold pressure.

In one embodiment, the VGT is operated or adjusted by closing the VGT to increase intake manifold pressure. In one embodiment, the VGT is controlled or adjusted by opening the VGT to increase intake manifold pressure.

In one embodiment, determining the pressure in the at least one cylinder including predicting the pressure in the at least one cylinder. In one embodiment, the pressure is predicted in response to an intake valve closing angle, a volume change in the at least one cylinder between the intake valve closing and bottom dead center, and the intake manifold pressure.

In another aspect, an apparatus includes a controller operable to control operation of a plurality of cylinders of an internal combustion engine and a VGT. The controller is configured to determine a crankcase pressure of the internal combustion engine, determine a pressure in at least one cylinder at bottom dead center of a piston in the at least one cylinder, and, in response to the pressure in the at least one cylinder being less than the crankcase pressure, operate the VGT to increase an intake manifold pressure of the internal combustion engine.

In an embodiment, the crankcase pressure is determined by one of detecting, sensing, or estimating the crankcase pressure. In an embodiment, the cylinder pressure is determined by predicting the cylinder pressure at bottom dead center of the piston of the at least one cylinder. In an embodiment, the prediction is based on an intake valve closing angle, a volume change between the early intake valve closing and bottom dead center, and the intake manifold pressure. In an embodiment, the intake manifold pressure is determined by one of sensing, detecting, or estimating the intake manifold pressure.

In one embodiment, the controller is configured to operate or adjust the VGT by closing the VGT. In one embodiment, the controller is configured to operate or adjust the VGT by opening the VGT.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
    an internal combustion including an intake manifold and a plurality of cylinders, each of the cylinders including at least one intake valve and at least one exhaust valve;
    a variable geometry turbine (VGT) for receiving an exhaust flow from the plurality of cylinders; and
    a controller operably connected with the VGT, wherein the controller is configured to:
        determine a crankcase pressure;
        determine a cylinder pressure of at least one cylinder associated with an early intake valve closing event; and
        in response to the cylinder pressure being less than the crankcase pressure, increase intake manifold pressure with the VGT.

2. The system of claim 1, wherein the crankcase pressure is determined by one of detecting, sensing, or estimating the crankcase pressure.

3. The system of claim 1, wherein the cylinder pressure is determined at bottom dead center of a piston of the at least one cylinder.

4. The system of claim 1, wherein the cylinder pressure is determined by predicting the cylinder pressure at bottom dead center of a piston of the at least one cylinder.

5. The system of claim 4, wherein the prediction is based on an intake valve closing angle, a volume change in the cylinder between the early intake valve closing and bottom dead center of a piston of the at least one cylinder, and the intake manifold pressure.

6. The system of claim 5, wherein the intake manifold pressure is determined by one of sensing, detecting, or estimating the intake manifold pressure.

7. The system of claim 1, wherein the controller increases the intake manifold pressure with the VGT by closing the VGT.

8. The system of claim 1, wherein the controller increases the intake manifold pressure with the VGT by opening the VGT.

9. A method for operating an internal combustion engine, comprising:
    determining, with a controller, a crankcase pressure associated with operation of an internal combustion engine including a plurality of cylinders each including at least one intake valve and at least one exhaust valve;
    determining, with the controller, a pressure in at least one cylinder at bottom dead center of a piston in the at least one cylinder; and
    in response to the pressure in the at least one cylinder being less than the crankcase pressure, controlling, in response to one or more commands from the controller, a variable geometry turbine (VGT) to increase an intake manifold pressure.

10. The method of claim 9, wherein the VGT is controlled in response to the one or more commands from the controller by closing the VGT to increase intake manifold pressure.

11. The method of claim 9, wherein the VGT is controlled in response to the one or more commands from the controller by opening the VGT to increase intake manifold pressure.

12. The method of claim 9, wherein determining the pressure in the at least one cylinder including predicting, with the controller, the pressure in the at least one cylinder.

13. The method of claim 12, wherein the pressure is predicted by the controller in response to an intake valve closing angle, a volume change in the at least one cylinder between the intake valve closing and bottom dead center, and the intake manifold pressure.

14. An apparatus, comprising:
a controller operable to control operation of a plurality of cylinders of an internal combustion engine and a variable geometry turbine (VGT), wherein the controller includes a non-transitory computer readable medium with instructions stored thereon, that when executed by a processor, perform the steps comprising:
determining a crankcase pressure of the internal combustion engine;
determining a pressure in at least one cylinder at bottom dead center of a piston in the at least one cylinder; and
in response to the pressure in the at least one cylinder being less than the crankcase pressure, operating the VGT to increase an intake manifold pressure of the internal combustion engine.

15. The apparatus of claim 14, wherein the crankcase pressure is determined by one of detecting, sensing, or estimating the crankcase pressure.

16. The apparatus of claim 14, wherein the cylinder pressure is determined by predicting the cylinder pressure at bottom dead center of the piston of the at least one cylinder.

17. The apparatus of claim 16, wherein the prediction is based on an intake valve closing angle, a volume change between the early intake valve closing and bottom dead center, and the intake manifold pressure.

18. The apparatus of claim 17, wherein the intake manifold pressure is determined by one of sensing, detecting, or estimating the intake manifold pressure.

19. The apparatus of claim 14, the steps further comprising:
operating the VGT by closing the VGT.

20. The apparatus of claim 14, the steps further comprising:
operating the VGT by opening the VGT.

* * * * *